(12) United States Patent
Wombles et al.

(10) Patent No.: US 9,243,191 B1
(45) Date of Patent: Jan. 26, 2016

(54) RE-REFINING USED MOTOR OIL

(75) Inventors: Robert H. Wombles, Midway, KY (US);
Timothy E. Laska, Loveland, OH (US);
John T. Turner, West Chester, OH (US)

(73) Assignee: Delta Technologies LLC, Lexington, KY (US)

( * ) Notice: Subject to any disclaimer, the term of this patent is extended or adjusted under 35 U.S.C. 154(b) by 845 days.

(21) Appl. No.: 13/135,861

(22) Filed: Jul. 15, 2011

Related U.S. Application Data (60) Provisional application No. 61/399,701, filed on Jul. 16, 2010.

(51) Int. Cl.
| | |
|---|---|
| *C10G 7/06* | (2006.01) |
| *C10M 175/00* | (2006.01) |
| *B01D 3/10* | (2006.01) |
| *B01D 1/14* | (2006.01) |
| *C10G 7/00* | (2006.01) |
| *B01D 3/14* | (2006.01) |

(Continued)

(52) U.S. Cl.
CPC *C10G 7/003* (2013.01); *B01D 3/06* (2013.01); *B01D 3/10* (2013.01); *B01D 3/143* (2013.01); *C10G 7/06* (2013.01); *C10M 175/0033* (2013.01); *C10G 7/04* (2013.01); *C10G 2300/1007* (2013.01); *C10G 2300/1062* (2013.01); *C10G 2300/4081* (2013.01)

(58) Field of Classification Search
CPC ............ C10G 7/003; C10G 7/04; C10G 7/06; C10G 7/10; C10G 2300/1007; C10G 2300/1062; C10G 2300/4081; C10G 2300/301; C10G 2300/80; C10G 2400/10; C10M 1/08; C10M 175/0033; B01D 1/14; B01D 1/0041; B01D 3/06; B01D 3/10; B01D 3/12; B01D 3/143; B01D 3/148; B01D 5/006; B01D 5/0027; Y10S 159/13; Y10S 159/16; Y10S 159/901; Y10S 202/01; Y10S 203/08; Y10S 203/90; Y10S 585/95
See application file for complete search history.

(56) References Cited

U.S. PATENT DOCUMENTS

| | | | | |
|---|---|---|---|---|
| 1,646,619 | A | * 10/1927 | Loomis et al. | 208/353 |
| 3,625,881 | A | * 12/1971 | Chambers et al. | 208/179 |
| 3,886,062 | A | * 5/1975 | Peiser et al. | 208/354 |

(Continued)

FOREIGN PATENT DOCUMENTS

| | | | | |
|---|---|---|---|---|
| WO | 2008059311 | * | 5/2008 | C10M 175/00 |

*Primary Examiner* — Virginia Manoharan
(74) *Attorney, Agent, or Firm* — Richard D. Stone (57) ABSTRACT

A process for re-refining used lubricating oil (ULO) having thermally unstable additives. ULO is heated by mixing with superheated lubricant boiling range hydrocarbons recovered and recycled from the process. The mixture of ULO feed and superheated hydrocarbons is charged to a vacuum column, producing an overhead vapor free of unstable additives and a residual fraction, containing additives. The overhead vapor is condensed to produce an overhead liquid of lubricant boiling range hydrocarbons, a portion of which is recovered as a product and a portion of which is recycled. The overhead liquid free of unstable additives, may be superheated without fouling to produce superheated fluid which can heat the ULO feed sufficiently to permit fractionation. Superheating may occur in a fired heater or preferably in a heat exchanger to prevent high temperatures and cracking of recycled liquid. Mixing of superheated fluid and ULO feed may occur in a pipe in fully developed turbulent flow, and preferably via an inline mixer. Energy efficiency is improved by heat exchanging ULO feed with product streams.

13 Claims, 2 Drawing Sheets

(51) Int. Cl.
  *B01D 3/06* (2006.01)
  *C10G 7/04* (2006.01)

(56) References Cited

U.S. PATENT DOCUMENTS

| | | | | |
|---|---|---|---|---|
| 3,923,644 A | * | 12/1975 | Hindman | 208/186 |
| 4,432,865 A | | 2/1984 | Norman | |
| 4,477,356 A | * | 10/1984 | Grow | 210/741 |
| 4,666,587 A | * | 5/1987 | Martin | 208/184 |
| 4,941,967 A | * | 7/1990 | Mannetje et al. | 208/184 |
| 5,244,565 A | | 9/1993 | Lankton et al. | |
| 5,286,380 A | | 2/1994 | Mellen | |
| 5,302,282 A | | 4/1994 | Kalnes et al. | |
| 5,447,628 A | | 9/1995 | Harrison et al. | |
| 5,556,548 A | | 9/1996 | Mellen | |
| 6,068,759 A | | 5/2000 | Moore et al. | |
| 6,402,937 B1 | | 6/2002 | Shaffer, Jr. et al. | |
| 6,402,938 B1 | | 6/2002 | Moore et al. | |
| 6,447,672 B1 | | 9/2002 | Moore et al. | |
| 6,508,916 B1 | * | 1/2003 | Razzaghi et al. | 203/11 |
| 7,150,822 B1 | | 12/2006 | Malone | |
| 7,226,533 B2 | * | 6/2007 | Angulo Aramburu | 208/179 |
| 7,241,377 B2 | | 7/2007 | Malone | |

* cited by examiner

RE-REFINING USED MOTOR OIL

CROSS REFERENCE TO RELATED APPLICATION

This application claims the benefit of our prior provisional application No. 61/399,701, filed Jul. 16, 2010, which is incorporated by reference.

FIELD OF THE INVENTION

The invention relates to direct contact heating of normally liquid hydrocarbons and the like, especially those which are thermally unstable or difficult to heat, e.g., processing used motor oil to recover distillable hydrocarbons.

BACKGROUND OF THE INVENTION

Processing used motor oil has been a problem in search of solution for over 50 years. It is a problem both in size and technology. In the USA, over 1 billion gallons of used motor oil is "produced". Little of it is recycled or used effectively and much is improperly dumped. Re-refining is a problem because the very additives which make modern lubricating oils stick to metal surfaces in an engine greatly complicate recovery of the lubricant boiling range hydrocarbons, at least recovery using commercially viable technology. The state of the art of producing, collecting and re-refining of used motor oil and other industrial oils will be reviewed.

Automotive and many industrial lubricating oils are usually formulated from paraffin based petroleum distillate oils or from synthetic base lubricating oils. Lubricating oils are combined with additives such as soaps, extreme pressure (E.P.) agents, viscosity index (V.I.) improver, antifoamants, rust inhibitors, anti-wear agents, antioxidants, and polymeric dispersants to produce an engine lubricating oil of SAE 5 to SAE 60 viscosity.

After use, this oil is collected from truck and bus fleets, automobile service stations, and municipal recycling centers for reclaiming. This collected oil contains organo-metallic additives such as zinc dialkylthiophosphate from the original lubricating oil formulation, sludge formed in the engine, and water. The used oil may also contain contaminants such as waste grease, brake fluid, transmission oil, transformer oil, railroad lubricant, crude oil, antifreeze, dry cleaning fluid, degreasing solvents such as trichloroethylene, edible fats and oils, mineral acids, soot, earth and waste of unknown origin.

Reclaiming of waste oil is largely carried out by small processors using various processes tailored to the available waste oil, product demands, and local environmental considerations. Such processes at a minimum include partial de-watering and coarse filtering. Some more sophisticated processors may practice chemical demetallizing or distillation. The presence of organo-metallics in waste oils such as zinc dialkylthiophosphate results in decomposition of the zinc dialkyldithiophospnate to form a carbonaceous layer rich in zinc and often other metals such as calcium, magnesium and other metals present as additives and thus difficult if not impossible to process. The carbonaceous layer containing the various metals forms rapidly on heated surfaces and can develop to a thickness of more than 1 mm in 24 hours. This layer not only reduces the heat transfer coefficient of tubular heaters rapidly, it also results in substantial or total occlusion of these tubes within a few days.

Successful reclaiming processes require the reduction of the organo-metallics (or ash) content to a level at which the hot oil does not foul heated surfaces. Such reduction can be carried out by chemical processes which include reacting cation phosphate or cation sulfate with the chemically bonded metal to form metallic phosphate or metallic sulfate. U.S. Pat. No. 4,432,865 to Norman, the contents of which are incorporated herein by reference, discloses contacting used motor oil with polyfunctional mineral acid and polyhydroxy compound to react with undesired contaminants to form easily removable reaction products. These chemical processes suffer from attendant disposal problems depending on the metal by-products formed.

Ash content can also be reduced by heating the used lubricating oil (ULO) to decompose the organo-metallic additives. Direct contact heating of ULO with a recycled bottoms fraction was disclosed in U.S. Pat. No. 5,447,628 to Harrison, et al., the contents of which are incorporated herein by reference. The ULO was added to a lower section of a vacuum column with an enlarged bottom section. There was enough volumetric capacity below the first tray of the column to provide "a residence time of 10 to 120 minutes." The EXAMPLE reported that a residence time of 45 minutes and a relatively constant temperature of 660° F. A dehydrated ULO fraction was mixed with a recycled bottoms fraction in the rate of 1:45. The long residence time and high temperature were believed sufficient to decompose the additives in the ULO, so that a bottoms fraction from this column could be sent to a fired heater, to supply the heat needs of the process. The patentee reported that additive decomposition began at 400° F. The Figure in the patent showed that zinc compound decomposition was a function of temperature, with time temperature decomposition profiles presented for 400° F., 500° F., 750° F. and 1000° F.

UOP's Hy-Lube process, described in U.S. Pat. No. 5,244,565, U.S. Pat. No. 5,302,282, and many more patents, uses a hot circulating hydrogen rich stream as a heating medium to avoid deposition of decomposed organo-metallic compounds on heating surfaces.

The problem of fouling of heated surfaces can be ameliorated to some extent by gentler heating. Some processes, such as the fixed bed version of catalytic cracking, the Houdry process, used a molten salt bath to provide controlled, somewhat gentle heating of vaporized liquid hydrocarbon passing through tubes of catalyst immersed in the salt bath. Molten metal baths have also been used as a convenient way to heat difficult to processes substances to a control temperature, e.g., flammability of some plastics is tested by putting a flask with plastic into a bath of molten metal. Use of molten salt bath, or molten metal bath, or condensing high temperature vapor, could be used to reduce uneven heating of heat exchange surface and thereby reduce $\Delta T$ across a metal surface and perhaps slow the fouling of metal surfaces in ULO service, but the additives in the ULO would still tend to decompose on the hottest surface, which would be the heat exchanger tubes.

In U.S. Pat. No. 7,150,822 and U.S. Pat. No. 7,241,377 Malone taught use of a molten metal or molten salt bath for direct contact heating of ULO. The process effectively heats ULO without fouling the heating surface, a molten metal or salt bath, but the process requires a large and heavy molten metal vessel for processing of the oil. Start-up of such a process, or perhaps operation, may have encountered problems as the first commercial unit is believed no longer in operation.

Solvent extraction with light paraffin solvents such as propane, butane, pentane and mixtures thereof have been practiced by Interline and others. Details of the Interline Process are provided in U.S. Pat. No. 5,286,380 and U.S. Pat. No. 5,556,548. While the extraction approach seems like an elegant solution to the problem of processing ULO, the process may be relatively expensive to operate. Their quarterly report of May 15, 2002, reports that "It has become evident that demanding royalties based on production is impractical in many situations and countries. Unless and until the re-refined oil produced in a plant can be sold at prices comparable to base lubricating oils, collecting royalties based on production will be difficult. This reality was experienced in Korea, where the royalty was terminated for the first plant, and in England where the royalties were reduced and deferred until the plant becomes profitable."

Another approach to ULO processing was direct contact heating of the ULO with steam or a non-hydrogenating gas. This solved the problem of zinc additive decomposition fouling of hot metal surfaces, by ensuring that the metal surfaces holding the ULO were always relatively cool. The hottest spot in these ULO process was the point of vapor injection. Decomposing additives had only themselves to condense upon.

A vapor injection ULO process was disclosed in U.S. Pat. No. 6,068,759 Process for Recovering Lube Oil Base Stocks from Used Motor Oil and U.S. Pat. No. 6,447,672 Continuous Plural Stage Heated Vapor Injection Process for Recovering Lube Oil Base Stocks from Used Motor Oil. The heated vapor was steam, methane, ethane, propane or mixtures. Other variations on the theme of ULO vapor injection are disclosed in U.S. Pat. No. 6,402,937 Pumped Recycle Vapor and U.S. Pat. No. 6,402,938, Vaporization of Used Motor Oil with Non-hydrogenating Recycle Vapor, which are incorporated by reference. This approach used a "working fluid" such as methanol or propane, which was heated and mixed with ULO to vaporize lube boiling range components. A lube fraction was recovered as a product and the methanol or propane working fluid either compressed, or condensed and pumped, through a heater to be recycled to heat incoming ULO.

Petroleum refiners have been trying for over half a century to devise a satisfactory way to reprocess used lube oil. No process is known which could be considered a commercial success. Despite the abundance of a potentially valuable waste material, the lubricating oil boiling range hydrocarbons trapped in the ULO, most ULO is not re-refined. The "state of the art" of used motor oil processing could be summarized as follows:

Chemical additive and extraction approaches can be used to react with or extract everything but zinc additives, but costs associated with such processes are apparently high, as evidenced by little commercial use. Additives could be extracted, but the operating costs are high.

Indirect heating in a fired heater causes rapid fouling of metal surfaces. Using milder heating, via a double boiler approach or molten metal heating medium, can minimize but not eliminate fouling on hot metal surfaces.

Direct contact heating with high pressure hydrogen may eliminate fouling but requires high capital and operating expenses.

Direct contact heating, with a recycled bottoms fraction can still suffer from heater fouling. A stream containing the non-distillable additive package and/or the decomposition products thereof is still sent through a fired heater where fouling can occur.

Direct contact heating with steam or a light hydrocarbon "working fluid" vapor is an attractive approach. When steam is the injected vapor, the process can create a water disposal problem and is thermally less efficient because the latent heat of water is lost when the steam is condensed against cooling water or air in a heat exchanger. There are also concerns about possible formation of emulsions or corrosive regions in portions of the plant, when water is condensing. When a "working fluid" is used for heating e.g., propane, the water problem is largely eliminated, but large volumes of vapor are needed to provide sufficient heat input, so costs increase to heat and recycle such vapor streams. The working fluid approach also calls for a somewhat higher capital cost, because higher pressure operation is generally needed to facilitate circulation of the large volumes of working fluid to heat the used lube oil feed.

We wanted a better approach, one which is simple and reliable and which does little or no harm to the used lube oil fraction. We define harm in the sense of thermally cracking the ULO and generating large amounts of reactive intermediate species, many of which are chloride containing.

Brute force heating, by recycling a bottoms stream, forces at least some of the additive package to end up in the bottoms and go through a fired heater, and cause fouling. The brute force approach vaporizes the lubricant boiling range components, but can easily degrade the lube components and contaminate them with significant amounts of the breakdown products of the additive package. The recovered lube boiling range components will have significant value as fuel or cracker feed blending component, but are generally not suitable for use as lubricant blending stock, at least not without a lot of expensive hydrotreating. Destructive distillation of ULO, by spraying it on top of a coker drum, decomposes the additive package and leaves it behind in the coke—but the valuable, paraffinic lubricant boiling range hydrocarbons are converted to coker naphtha or other reactive and difficult to process fractions. The lube fraction is arguably "recovered" but is no longer remotely suitable for use as a blending component.

Steam injection, for heating of ULO, would minimize thermal degradation of lubricant boiling range hydrocarbons in the ULO, but the relatively "wet" approach causes concerns about disposal of waste water, emulsion formation and/or plant corrosion. The "pumped vapor" approach, using propane or the like, eliminates most water problems, but requires a more complicated plant to recycle the hydrocarbon vapor. Large molar volumes of injected vapor are needed because of the relatively low molecular weight and low heat capacity of hydrocarbon vapors. Condensation and separation of injected heating vapor and recovered lubricating components are somewhat expensive.

We wanted to vaporize the valuable lube components in ULO without unduly damaging the lube containing vapor product or fouling the plant heaters. We realized that there was a way to overcome the deficiencies of the prior art process by doing something akin to early treatment of FCC feed. In the FCC process, refiners charge a selected distilled fraction to the cracking unit. A distilled feed is used because distillation leaves behind unwanted metal species which are a poison to the cracking catalyst. Our approach was something like an island hopping campaign in war. We did not care about eliminating the enemy, namely the additive package, if we could get around it.

We found in the effluent of a used lube oil refining process the ideal material to heat the incoming used lube oil. The recovered distilled lubricant boiling range material was essentially a metal and contaminant free material. This material could be safely heated without additive fouling of metal surfaces to produce a super-heated fluid which could be mixed with and vaporize a ULO feed. It may seem counter-intuitive, to use a clean, distilled material that was the desired product of the process, to send this product to a heater at temperatures which could in time thermally crack the product, and then mix this clean superheated product completely with a highly contaminated feed. Refiners usually want to recover a valuable product and send it to storage for sale, not heat it to a temperature which could in time coke it, and then mix it with a highly contaminated feed stock.

The key feature was heating the ULO with a clean, distilled material—a portion of the lubricant boiling range product recovered from the used lube oil fractionator. This material was essentially free of metals and could safely be heated in a heat exchanger or fired heater without fear of fouling. This distilled material, a lubricant boiling range fraction, was always available downstream of the vaporizing portion of the plant. It has a high boiling point, essentially the same as the boiling point of the lubricating oil components of the ULO feed to the process. This vaporized lube fraction could be readily condensed at high temperature. It also, by virtue of its high molecular weight, could carry a lot of energy with it when heated in a furnace or heat exchanger so that undue volumetric amounts were not required to achieve the desired amount of direct contact heating of ULO feed.

We realized that the high grade energy in hot, vaporized lubricant boiling range hydrocarbon vapor recovered from the ULO, could be used to effectively and gently preheat incoming feed for energy savings. The resulting condensed lube fraction could also be split into a net product fraction removed from the process and a recycle fraction sent through a fired heater, heat exchanger or other heating means to generate the hot vapor needed to vaporize the ULO feed. The relatively hot product liquid fraction could be used for a measure of preheating of ULO to facilitate dehydration.

The use of a vaporized lubricant boiling range hydrocarbon simplified the process flow and gave the option to achieve significant improvement in thermal efficiency of the process and facilitate plant operation. Lubricant boiling range materials are always available in the feed ULO, so no purchased working fluid is needed save perhaps at initial startup. The vaporized lube fraction condenses readily at elevated temperature, even under vacuum conditions so fin fan coolers or heat exchangers can easily condense these vapors. Preferably much of the energy in the vaporized lube fraction is recovered by heat exchange with ULO feed.

The condensed lubricant boiling range material recovered from the product is a relatively stable material, at least far more stable than the feed ULO. This stable material may tolerate a lot of heating by heat exchange with heavy residue material withdrawn from the product fractionator, by heating in a fired heater, or by heat exchange with some other high temperature heat source. While the paraffinic lubricant boiling range material is subject to thermal cracking, at least the only cracking products will be those typically experienced during mild thermal cracking of relatively pure hydrocarbons, a modest amount of olefins. Such a stream is a valuable product, suitable for use as cracker feed or, depending on thermal severity, suitable for use as a lubricant blending stock. With hydro-processing it can produce a premium blending stock or fuel. Such modestly cracked streams with some olefins but few dienes may be processed easily using conventional refinery technology, whereas severely cracked streams with high diene content require extra and expensive processing to make them stable enough for further processing.

BRIEF SUMMARY OF THE INVENTION

Accordingly, the present invention provides a process for re-refining a used lubricating oil (ULO) containing lubricant boiling range hydrocarbons and a thermally unstable additive package which fouls metal surfaces used to heat said ULO to vaporize said lubricant boiling range hydrocarbons comprising heating by direct contact heating of said ULO with a superheated fluid comprising lubricant boiling range hydrocarbons recovered from said ULO to form a heated mixture of said ULO and said superheated ii) recycled fluid, fractionating said heated mixture in a vacuum fractionation means to produce a vapor fraction comprising at least a majority of the lubricant boiling range hydrocarbons in said ULO feed, which vapor fraction is essentially free of said thermally unstable additives, and a residual liquid fraction comprising said thermally unstable additives, at least a portion of the decomposition products of said additives and a minority of said lubricant boiling range hydrocarbons in said ULO feed, cooling and condensing said vapor fraction to produce an overhead liquid feed stream comprising at least a majority of lubricant boiling range hydrocarbons in said ULO feed and at least a majority of said lubricant boiling range hydrocarbons in said superheated fluid, recovering a portion of said overhead liquid as a product of the process, and recycling a portion of said overhead liquid through a heating means to produce a superheated fluid comprising lubricant boiling range hydrocarbons and mixing said superheated fluid with said ULO feed to heat said ULO feed by direct contact heat exchange.

In another embodiment, the present invention provides an apparatus for distilling a liquid feed comprising at least one of water and hydrocarbons boiling below the lubricant boiling range, lubricant boiling range hydrocarbons and thermally unstable additives which form coke when heated indirectly on a hot metal surface, said apparatus comprising a preheater means receiving said liquid feed and discharging a preheated feed, an atmospheric flash vessel receiving said preheated liquid and discharging a vapor stream and an atmospheric flash liquid bottoms stream, a vacuum flash vessel receiving said atmospheric flash liquid bottoms stream and discharging a vapor stream and a vacuum flash liquid bottoms stream, a mixer receiving said vacuum flash liquid bottoms stream and a recycled, superheated recovered product stream and discharging a heated mixture, a fractionator receiving said heated mixture and fractionating it into at least one overhead vapor stream comprising lubricant boiling range hydrocarbons and a liquid residue comprising said unstable additives or decomposition products thereof and a minor portion of lubricant boiling range hydrocarbons, a fractionator overhead vapor condenser and receiver cooling and condensing said fractionator overhead vapor into a liquid product stream comprising lubricating boiling range hydrocarbons and splitting said liquid product into at least two streams, a product stream withdrawn as a product of the process and a recycle stream, and a recycle heater receiving said recycle stream and producing a superheated recovered product stream which is charged to said mixing means.

The invention will be more fully understood from the following description of the preferred embodiment taken in conjunction with the figures.

DETAILED DESCRIPTION OF PREFERRED EMBODIMENTS

Figure 1:
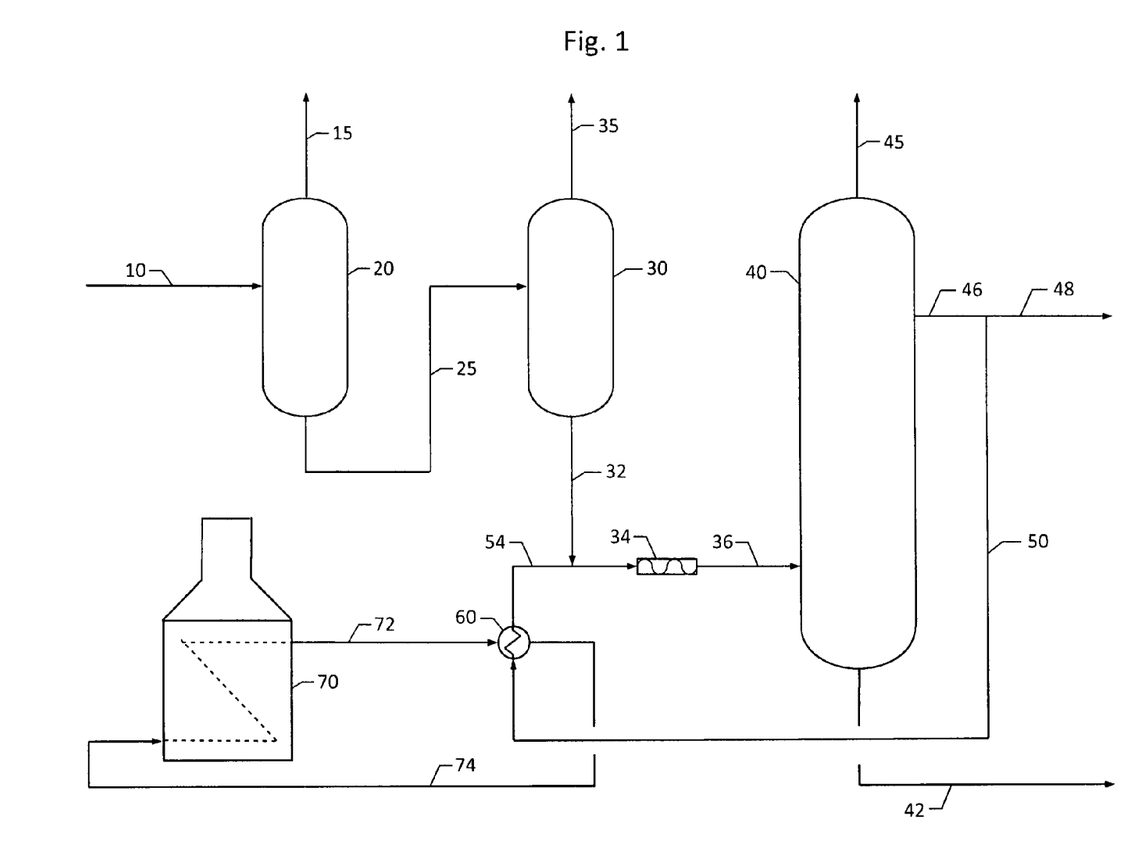
FIG. 1 is a simplified schematic drawing of an embodiment wherein used oil is heated by direct contact heating with a heated, recycle, vapor stream derived from the used oil feed.

In FIG. 1, as-received Used Lube Oil (ULO) flows from a feed storage system, not shown, through line 10 into the atmospheric flash vessel 20. The ULO feed has been preheated by means not shown to a temperature sufficient to permit atmospheric flashing of water and volatile hydrocarbons and subsequent vacuum flashing, as discussed later, of components boiling below the lube boiling or gas oil range. Water and volatile hydrocarbons or other volatile material, which flashes at say atmospheric pressure and 400° F., are removed from the ULO feed via line 15 as a vapor. These vapors may be incinerated, used as fuel for heating needs of the process or otherwise treated. There are other modes of operation, where more or less material is flashed from the ULO, but in many applications, removing the materials which flash at 400° F., at atmospheric pressure, will be preferred.

Dehydrated ULO is removed from vessel 20 via line 25 and charged to vacuum flash vessel 30. A pressure control valve, not shown, may be used to regulate flow from vessel 20 to vessel 30. In vacuum flash vessel 30, the temperature is slightly lower than the temperature in the atmospheric flash vessel as some cooling occurs due to flashing of water, in vessel 20 and flashing of light hydrocarbons in vessel 30. Typically a vaporized hydrocarbon stream comprising gasoline and diesel boiling range components is removed via line 35, for cooling, condensing, and further handling by means not shown. The net effect of these atmospheric and vacuum flashing steps is to produce a used lube oil fraction with a significant reduction in material boiling below 600° F., though it should be remembered that one or more simple flashing steps will not produce a "clean cut" material. A flash stage is basically a distillation column with a single tray and such a device can only achieve a limited split of say, 600 F+ material in the bottoms and 600° F.– material overhead, there will be considerable overlap in boiling range of the two streams, the overhead vapor and the bottoms liquid.

A dehydrated, somewhat de-volatized ULO fraction is withdrawn from vessel 30 via line 32 and charged to the inlet of inline mixer 34. A hot recycle fraction, from a source hereafter discussed, is also charged to the inlet of inline mixer 34, to produce a heated mixture of ULO feed and a recycled stream. This heated mixture is charged via line 36 to fractionator 40. Light hydrocarbons are removed via line 45 while a liquid fraction, comprising a majority of the lubricant boiling range components in the feed, is withdrawn via line 46. A portion of this liquid is withdrawn as a product fraction, via line 48, while the remainder is recycled via line 50 through heat exchanger 60, to produce the heated recycle stream charged via line 54 to in line mixer 34. Not shown are many conventional elements of a vacuum fractionator, a vacuum system such as a steam jet ejector, pumps, condensers, reflux lines to the column. Removed from the bottom of vacuum fractionator 40 via line 42 is a residual product, which may be cooled by conventional means not shown and sent to storage.

The recycled fraction heated in heat exchange means 60. A circulating fluid enters the heat exchanger via line 72, heats the recycled lubricant rich fraction, and is returned via line 74 to fired heater 70. Although a fired heater is shown, it is possible to use an electric heater or other source of hot fluid for use in heating the recycle liquid in heat exchanger 60.

The simplified representation in FIG. 1 omits many conventional details, such as pumps, temperature controllers and the like, but these features are conventional. The vacuum distillation column, or columns, should multiple column operation be preferred, will have the following conventional components. Working from the bottom up, there can be a wash bed with sufficient wetting of surfaces to prevent coking or fouling. Above this will usually be a reflux section for heavy distillate, comprising chimney trays, sieve trays, mesh packing or other structured packing, along with means for adding reflux liquid. A similar section, for light distillate, will usually be above this. A demister will usually be added to an upper portion of the column, so that fine particles of liquid may be recovered as a liquid and retained in the vacuum column, rather than being entrained out with the overhead vapor.

In addition, demisters may be added to each flash vessel, to removed liquid mist entrained in a vapor product.

Figure 2:
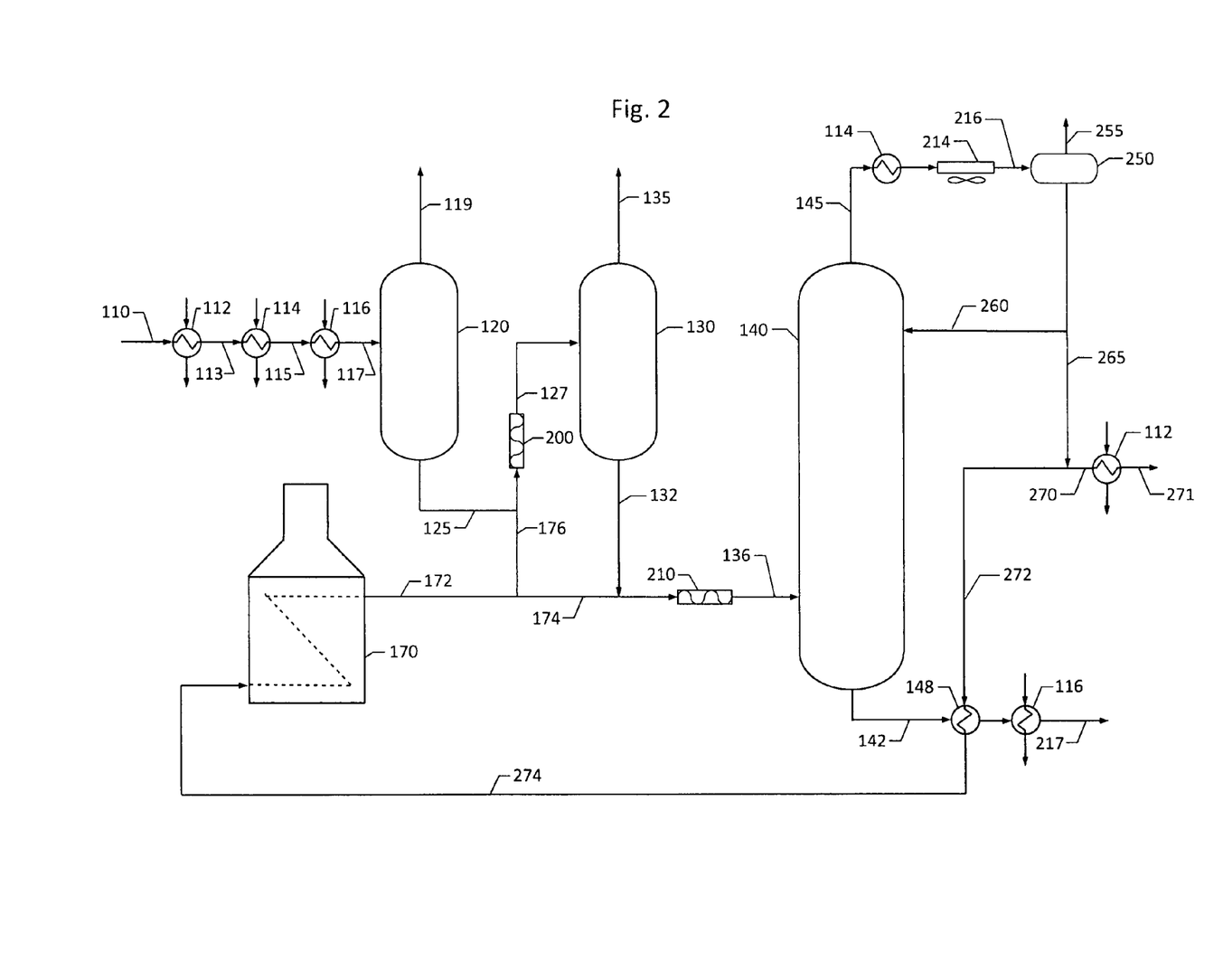
FIG. 2 is similar to FIG. 1, but shows more detail and preferred heat exchange and control elements.

FIG. 2 shows more details including extensive energy conserving features. In the embodiment shown, only a single heater, usually a fired heater, is required to satisfy the heating needs of the process. This approach also uses the energy in various product/recycle streams to great advantage in providing needed heat inputs, cool product streams, and reduce the amount of energy consumed in re-refining the ULO.

A ULO stream is charged via line 110 through at least one, and preferably all of three heat exchangers 112, 114 and 116. The fresh ULO feed can be first heat exchanged against a liquid product lube boiling range fraction being removed from the process. This lube product, typically about 70-90 LV % of the feed, may be at a temperature of 300-500° F., typically about 400° F. It should be cooled prior to storage for safety reasons. This lube product stream is at just the right temperature, and has just the right volume, to supply most or all of the preheating needs of the process. The ULO feed, typically at 60-80° F. in feed storage tanks, is heat exchanged against a similar volume of lube product, to produce a partially, or totally, if desired, preheated feed in line 113. Heat exchanger 112 produces a ULO stream having a temperature of say 300° F. in line 113. Next the feed may be further heated, in heat exchanger 114, by heat exchange against vapors removed from the vacuum distillation column 140, as discussed hereafter. The overhead vapors from the column are, theoretically, at about the same temperature as the temperature of the condensed liquid removed from the overhead receiver. Heat exchanger 114 can be used to cool and condense the hot overhead vapors from the vacuum column. The condensing overhead stream can preheat the incoming ULO feed to the desired temperature. The overhead vapor stream from the vacuum column typically contains two to three times more material, on a molar basis, than the feed ULO. It is possible to heat the ULO feed to something approaching the temperature of the vacuum column overhead vapor, say to within 20-40 degrees. The temperature of the by now thoroughly preheated feed removed from exchanger 114 via line 115 will be say 325° F. or slightly higher, depending on the amount of heat exchange capacity one wants to buy and the amount of pressure drop that can be tolerated getting vacuum column overhead vapors through the heat exchanger.

If the temperature in line 115 is sufficient to flash off all water, and all light hydrocarbons from the ULO feed then no further heating is required. If a higher feed preheat temperature is desired, to flash off more light hydrocarbons, such as heavy gasoline or lighter gas oil fractions in the flash drum 130, then additional preheating is possible by heat exchange with a bottoms fraction in heat exchanger 116, as discussed in more detail hereafter.

The use of heat exchangers in refinery processing is conventional, but what is unusual, and beneficial, is the use of selected streams for preheating that are unlikely to do any damage, in the sense of decomposing the ULO feed. The ULO feed is stable at temperatures encountered in a typical automobile engine and can easily tolerate temperatures of 400° F. for extended periods and even higher for short periods. The lube fractions recovered from the vacuum tower 140 are always below the temperature at which lube decomposition starts. If there are minor upsets, flow rate and even temperature of heat exchange liquid to heat exchangers 112 and 114 may fluctuate some, but the temperature in these exchangers should never be high enough to cause significant additive decomposition. This is in marked contrast to what happens if a fired heater is used for preheating. A high temperature can be reached due to a temperature controller malfunction or some portion of the fired heater can have a hot spot or a stagnant region where tube wall temperatures increase. Flow slows, fouling starts and progresses and will soon lead to complete plugging of a fired heater.

The use of lubricant product for heating, whether a liquid product or overhead vapors containing lubricant boiling range hydrocarbons, will always be a "safe" way to heat ULO by heat exchange. When further preheating of ULO feed is required, it is possible to achieve some additional heating of ULO feed by heat exchange with at least a portion of the bottoms fraction removed from the vacuum distillation column. This bottoms fraction, as removed from the vacuum column, is hot and caution should be exercised in its use for heat exchange of ULO feed. Preferably the residual liquid has been heat exchanged or cooled to some extent so that it is not hot enough to cause significant additive breakdown of ULO feed in the heat exchanger 116. Some additive breakdown can be tolerated if flow conditions are sufficiently vigorous so that "hot spots" do not develop and flow is fast enough to keep ULO feed moving rapidly through the exchanger. The advantage of use of residual liquid as a heating medium is that it may be used to heat the incoming ULO feed to a higher temperature than can be achieved using only overhead product vapor or overhead product liquid.

After the desired amount of preheating is achieved, the preheated ULO feed is charged via line 117 into atmospheric flash vessel 120, where water vapor and other light hydrocarbons are removed via line 119. This material may be burned to supply heat needs of the process or incinerated to destroy contaminants that may be present. Dehydrated ULO is then charged via line 125 to an optional in-line mixer 200, where the dehydrated ULO can optionally be further heated by direct contact heating with a heated, recycle product stream, as discussed in more detail hereafter. The ULO is charged via line 127 to vacuum flash 130. Reduced pressure in vessel 130 allows most hydrocarbons boiling below the lube oil boiling range to flash and be removed via line 135. This material may be burned as fuel for the re-refining process, incinerated or further processed and recovered as a product, after conventional cooling and condensing, if desired.

The dehydrated, somewhat devolatized used lube oil is withdrawn as a liquid from vacuum flash 130 and charged via line 132 to mix with a heated, recycle product stream 174. The two streams, ULO and the heated recycle product, merge, either in or immediately upstream of optional inline mixer 210. The inline mixer is a preferred, and conventional, device, available from several manufacturers. It is optional as careful control of pipe sizing and flow can, and preferably does, generate fully developed turbulent flow, which does a good job of mixing two highly miscible fluids, such as ULO and a recycled lube oil boiling range fraction. Turbulent flow is also keeps the pipe walls wet and somewhat "scrubbed" by the turbulent flow, lessening the chance of fouling or plugging of pipe walls.

The mixture of ULO and recycled product will generally be discharged as two phases, vapor/liquid, into vacuum column 140 via line 136. This material will generally be at a temperature of 500 to 750° F., preferably 550 to 650° F., ideally 575-625° F. This mixture should be at a temperature sufficient to vaporize in the conditions existing in the vacuum column at least 80 mole % of the lubricant boiling range components in the incoming ULO feed. It is possible, by using pumps and a pressure reducing valve, to keep the material primarily, or perhaps entirely, in the liquid phase, but it will usually simply be at enough pressure to get the combined liquid stream, or ULO and recycled product, through the piping and mixer, if used, and into the vacuum column 140.

Vacuum column 140 is preferably a conventional distillation column with enough trays or internal packing material to help separate lube oil boiling range materials from heavy materials. The primary, and preferably the sole, means of heat input into the column is the high temperature of the feed stream. The mixture of ULO and recycled product has been heated, by the injection of heated recycled product, to a temperature sufficient to achieve the desired amount of vaporization in the vacuum column, which is quite a lot of vaporization. There must be enough heat in the feed stream to vaporize all the recycled lube stream used for heat input and the desired amount of lube oil components to be recovered from the ULO. Typically 50 to 90%, preferably 70 to 85%, and ideally 70% of the lube boiling components in the ULO will be recovered as a product. If not enough energy is added to the column, in the form of a hot feed mixture, then less lubricant boiling range material will be recovered, with overproduction of the generally less valuable residual fraction. There is an upper limit on feed vaporization in that it is important to leave some lubricant boiling range materials in the bottoms product to permit its withdrawal as a liquid and facilitate further handling. This material has value as an asphalt extender, addition to coker feed, or other uses.

Vaporized lubricant boiling range materials are withdrawn overhead from vacuum fractionator 140 via line 145. Although it is possible to use conventional methods of handling this material, e.g., cooling in fin fan coolers or heat exchange with cooling water, it is preferred to use vaporized lube boiling range hydrocarbons for heat exchange in this process. The temperature of the overhead vapor, generally 300-400° F., typically 350° F., makes it ideal for preheating of fresh ULO feed. The moderate temperature of the vaporized lube boiling range material is ideal for preheating ULO feed without decomposing it. Preferably hot overhead vapor is charged via line 145 to heat exchanger 114, as previously discussed, to heat incoming fresh ULO feed. This heat exchange may condense enough overhead vapor to permit recovery of the desired amount of liquid for column reflux, product recovery and for use as a recycled heating medium in in-line mixer 210. If the amount of heat exchange in exchanger 114 is not sufficient to produce enough condensed liquid, then additional cooling may be done by heat exchange with water, not shown, or use fin fan coolers 214 with the condensed liquid charged via line 216 to overhead receiver 250.

Preferably essentially all overhead vapor removed from the vacuum column is condensed, as the lighter materials will usually have been removed either by the atmospheric flash 120 or vacuum flash 130. Some light ends may remain and these will be removed from the process via line 255, connective with a conventional vacuum means such as a steam jet ejector, not shown. Depending on how "hard" the process is run, there may be some breakdown of additive package components or thermal cracking of the lubricant boiling range hydrocarbons. The vacuum system should be sized large enough to handle these low boiling materials.

The cooled and condensed lubricant boiling range materials are collected in overhead receiver 250. The desired amount of reflux is charged via line 260 back to the vacuum column and the remainder passes via line 265 for product recovery and recycle. The net production of lubricating oil boiling range materials is withdrawn as a liquid via line 270.

This liquid is usually still hot as the condensing system preferably removes just enough heat to condense the overhead vapor, not to cool it further. For safety, the recovered lube product should be cooled before storage. This stream, is typically 60-90 Liquid Volume % (LV %) of the dehydrated ULO feed, preferably about 80%, is an ideal stream for charging via line 270 for heat exchange with incoming ULO feed in exchanger 112. The product liquid is a liquid, so a compact L/L heat exchanger may be used. The product liquid in line 270 is one of the "coolest" streams in the plant, though considerably warmer than the ULO feed, so it may be safely used to heat incoming ULO with little or no risk of thermally degrading the ULO feed. The net production of lubricating oil boiling range hydrocarbons is removed from the plant via line 271 and charged to storage tanks, not shown.

The remaining portion of lubricant boiling range hydrocarbons is charged as a liquid via line 272 for superheating and reuse in the process, to vaporize distillable components from the feed ULO. To that end, recycled product must pass through a heater, such as fired heater 170 to produce a superheated stream charged via lines 172 and 174 to mix with the dehydrated ULO feed in line 132 withdrawn from the vacuum flash vessel 130. Preferably, the recycle product is first heat exchanged against bottoms fraction withdrawn from vacuum column 140, namely the residual fraction 142. This residual fraction, representing perhaps 10-40%, and preferably about 20 LV % of the ULO, is withdrawn as a liquid from the bottom of the column, usually at a temperature near that of the feed temperature entering the column. As such, there is a significant amount of high grade heat which may be used to achieve significant preheating of recycle liquid in line 272 in heat exchanger 148. This reduces the amount of fuel, or electricity or other energy, which must be added to the recycle product stream. The bottoms product withdrawn from the vacuum column 140 may also be used to achieve additional preheating of ULO feed, by heat exchange against ULO feed in exchanger 116. Preferably, heat exchange of the unstable ULO feed is done only when the column bottoms fraction, has been cooled to some extent by heat exchange or other cooling, so that the bottoms fraction is at a temperature below that which will cause thermal cracking or degradation of ULO feed. After such optional heat exchange, and further cooling or energy recovery by means not shown, the bottoms fraction is recovered as a heavy product of the process and charged via line 212 to product storage, not shown.

The heated recycle material withdrawn from the fired heater 170 via line 172 may also be charged via line 176 to mix with liquid withdrawn from the atmospheric flash vessel 120. This may be done when, e.g., the feed ULO contains a relatively large amount of gasoline or other lighter boiling components, which are to be recovered in the vacuum flash vessel 130. If higher temperatures are needed in vacuum flash 130, mixing ULO with some heated recycle product is an easy way to achieve such heating. Mixing may occur simply by in line mixing as the fluid flows through the pipes or preferably in-line mixer 200 may be used to facilitate rapid mixing.

DESCRIPTION OF PREFERRED EMBODIMENTS

Discussion

The discussion that follows focuses on feedstocks, then each step of the process.

Feedstocks

Any feed containing a normally liquid hydrocarbon can be heated using the process of the present invention. The normally liquid hydrocarbons include C5 and heavier hydrocarbons, e.g., naphtha boiling range up through residual fractions. Heavy feeds are contemplated for use herein, including those which are so heavy that they are not liquid at room temperature, e.g., grease, wax, petrolatum or indeed any hydrocarbon having a high melting point may be used as feed. These materials will, upon heating, form liquids and may be used as feed. Treatment of solids is outside the scope of the present invention, i.e., treatment of coal or dirt contaminated with oil is outside the scope of the present invention. What is essential for the practice of the present invention is that the feed have at least some distillable components boiling above the gasoline boiling range and direct contact heating of the feed by mixing with a hot, recycled, stream comprising, e.g., lubricant or gas oil boiling range hydrocarbons.

ULO is the feed contemplated for primary use herein. The ULO will frequently contain both light and heavy contaminants and large amounts of paraffinic hydrocarbons, in the C16 to C50 range. Light contaminants include water, naphtha and some impurities introduced during the ULO collection process. Heavy contaminants include the additive package. When processing ULO, the economic incentive is usually to vaporize as much ULO feed as possible. This can create a problem as the residue will not flow when too much of the feed is vaporized. About 60-90% vaporization of the dry used oil will usually be the target, with 80 LV % vaporization of dehydrated ULO feed giving good results.

ULO is the most difficult to re-refine of industrial waste oils, but other waste or low value oil containing liquids may be treated as well. By way of example, but not limitation, fluids which may be treated include cutting oils, crude oil emulsions, tanks bottoms and any of the myriad other materials mentioned in the voluminous art discussed above on re-refining of used lubricating oil, all of which are incorporated herein by reference. The process can tolerate some sediment and solids, provided the plant is built so that large sized particles can be filtered and small sized particles can be carried out with the residual liquid fraction without clogging the plant.

An additional liquid feed may be added to the ULO feed selected from the group of waste oils, emulsions, vegetable oil and grease.

Dehydration

The initial treatment step, dehydration or removal of water and light volatiles, typically those boiling in the gasoline, or gasoline and diesel boiling range and lighter, is preferred but not essential. If the feed stocks contain little in the way of volatile material or the vacuum system is sufficiently robust to remove the volatiles in the feed, then dehydration is not required. Most refiners will prefer to dehydrate the feed and remove the "light ends" such as gasoline added by crankcase dilution or some light solvent dumped into the used lube oil container by a worker in a garage. The removal of water and light ends simplifies the operation of the downstream portions of the plant, insulating it to a great extent from upsets and gas pains which might be experienced by an unusual used oil feed.

This step will usually be run at a temperature above 200° F., preferably above 300° F. and most preferably at 400° F. or more. The pressure will usually be atmospheric, to simplify construction and operation, but it may be operated under vacuum when desired. The temperature and pressure should be sufficient to remove at least a majority, and preferably at least 90 mole % of the water. Preferably this step removes a majority of the gasoline and lighter boiling range components, although in some circumstances it may be beneficial to have, e.g., a first flash, removing water and light naphtha and other light materials that may be present, followed by a second flash, at lower pressure or higher temperature to remove gasoline boiling range components, say those boiling below 400° F.

Although we prefer to use a simple flash drum, equivalent to one theoretical tray of separation, it is possible to conduct the flash in a column to achieve some measure of separation of lighter components removed from the ULO.

Vacuum Flash

This step is designed to remove those molecules from the ULO which can be removed at relatively mild conditions. This will include some gasoline components and some lubricant boiling range components. The vacuum flash will typically be at the same, or a higher temperature, than the initial dehydration treatment. The vacuum flash will be at a lower pressure, to facilitate flashing of molecules boiling below the lube oil boiling range. This flash will usually be a simple flash in a flash drum, equivalent to a one theoretical tray distillation column. Where desired, a conventional vacuum distillation column may be used, but for most purposes a simple flash drum will be sufficient and will be all that is used. The vacuum flash removes a poorly defined fraction comprising heavy gasoline and lighter lubricant boiling range components. This material will usually have significant value as a fuel, for use in the re-refining process or for sale.

The temperature in the vacuum flash will typically be 300 to 650° F., preferably 400 to 600° F., and ideally about 400° F. The pressure will typically be 5 to 250 mm Hg, preferably 10 to 200 mm Hg, ideally about 20-50 mm Hg. Temperature and pressure are related and when a relatively clean feed with little in the way of light ends is being processed, or when a robust vacuum system is available, it is possible to run the vacuum flash at the lower range of temperature and with a higher vacuum. If the feed is heavily contaminated, or for some reason light ends are being generated due to thermal cracking in the system, or the vacuum system is not working well, then higher temperatures will be required to remove the desired amount of distillable hydrocarbons in the vacuum flash.

The main function of the vacuum flash is to recover as much as possible in the way of distillable liquids from the ULO feed at conditions which cause no, or only modest amounts of, thermal cracking of ULO feed or decomposition of thermally decomposable materials in the ULO feed, such as the additive package.

Direct Contact Heat Exchange/Lube Distillation

This is the most difficult portion of the plant to operate, difficult in that the conditions could easily produce thermal cracking of the lube portions of the feed, degradation of additives and other thermally decomposable compounds in the ULO feed, and fouling of the plant.

Thermal cracking of hydrocarbons is a function of time and temperature and the nature of the hydrocarbon. The earliest cracking processes, e.g., the Dubbs process, subjected a heavy crude oil fraction to high temperatures, cracking some of the larger molecules to form some light ends and other lighter molecules. The formation of smaller molecules from bigger ones meant that the product contained not only viscous, heavy, long-chain feed molecules, but some lighter ones as well that were thinner. Refiners could make a low viscosity product by cracking a heavy feed sufficiently so that the feed made its own cutter stock, hence the name "visbreaking" for one type of early cracking process. Thermal cracking is not all bad, but in most instances the plant will be run to minimize thermal cracking. Thermal cracking is an important parameter and frequently a limiting factor on severity, so it is reviewed below.

In most hydrocarbon processes, there is a tradeoff between reaction temperature and residence time of reactants. Because visbreaking is a well-known and widely practiced process correlations have been developed so that it is possible to express precisely the severity of a visbreaking process. Although cracking of ULO feed is not the goal of our process, and in general is something we avoid, the concept of "severity" is a good way to view one of the constraints of our process, namely ensuring that the feed ULO does not foul up the plant.

As in visbreaking, a given severity does not mean that a certain amount of fouling, additive degradation, or thermal cracking of ULO will occur, rather it means that it is possible to predict that if all other reaction parameters are unchanged (e.g., feed composition, reactor pressure) except for the temperature and residence time in the reactor, two operations can be compared and it can be determined whether one process is more severe than the other. Equations and tables have been developed for comparing reaction severities. Typical of such presentations is the discussion of "soaking factor" in Petroleum Refinery Engineering—Thermocracking and Decomposition Process—Equation 19-23 and Table 19-18, in Nelson—Modern Refining Technology, Chapter 19, which is incorporated herein by reference. Although that text uses the term "soaking factor", the term "ERT" or "Equivalent Reaction Time" in seconds as measured at 427° C. (800° F.) is used in this specification to express visbreaking severity; numerically, soaking factor is the same as ERT at 427° C.

ERT refers to the severity of the operation, expressed as the equivalent number of seconds of residence time in a reactor operating at 427° C. (800° F.). In very general terms, the reaction rate doubles for every 12 to 13° C. increase in temperature. Thus, 60 seconds of residence time at 427° C. is equivalent to 60 ERT, and increasing the temperature to 456° C. would make the operation five times as severe, i.e. 300 ERT. Expressed in another way, 300 seconds at 427° C. is equivalent to 60 seconds at 456° C., and the same product mix and distribution should be obtained under either set of conditions.

The visbreaking process conditions which may be used, or which can be tolerated, depend to some extent on the amount of thermal cracking of ULO components which can be tolerated. For visbreaking of a heavy feed, sufficient to reduce the viscosity to enhance value of the product, processing severities are typically in the range of an Equivalent Reaction Time at of 250 to 1500 ERT seconds. In general terms, this is about an order of magnitude more cracking than is desired or required for ULO re-refining. Usually it will be beneficial to design the plant so that the ERT, from the point of mixing just upstream of the vacuum column to the point when residue is removed from the vacuum column, is less than 100 ERT seconds and more preferably less than 50 ERT seconds. When the recovered lube product is destined for reuse as a lube blending stock, it will be beneficial to limit ERT to 25 or less, with an ERT of 2-10 being most preferred.

ERT is a significant constraint or at least a guideline for the operation of the heater, the mixing zone and vacuum flash. ERT can, in effect, be an upper limit on severity. Another constraint is operating the vacuum column at a temperature and pressure sufficient to vaporize 100% of the recycled lube material and 100% of the desired lube product. Distillation is a function of temperature and pressure alone, save for any thermal cracking of lube or degradation of additive materials which may occur in the vacuum column. Successful recovery of a desired amount of lube product requires a minimum temperature, while limiting thermal cracking involves time and temperature. The heater, mixing zone and vacuum column should be operated to keep the ERT severity at a relatively low level.

Additive based fouling is often experienced but not well understood. The zinc additives, such as zinc dialkyldithiophosphates (ZDDP) adhere to metal surfaces and become "stickier" as temperatures increase. This is a wonderful property in an engine, but causes havoc, or at least fouling, in a re-refining process. ZDDP decomposition seems to start above 400° F. and increase exponentially above that temperature, though the initial decomposition rate is relatively low. The tendencies of ZDDP to stick to hot metal surfaces is the most troubling aspect, if the feed ULO is exposed to any surfaces which are hot, the oil tends to stick and given the long residence time, will eventually foul the surface.

Thus there are three constraints which must be considered in designing and operating the plant. The vacuum column has to run hot enough and at a low enough pressure to allow vaporization of the desired amount of lubricant boiling range material. The ULO feed should not be subjected to excessive reaction severity, as that will produce extended thermal cracking and some downstream additive degradation, primarily in the bottoms of the vacuum column. Finally, the additive material should not be exposed to hot metal surfaces, lest the additive start fouling.

Using a compatible liquid, a recycled lubricant boiling range stream as the heating medium instead of using hot metal to heat ULO solves the most significant problem, additive induced fouling of metal surfaces. The hottest thing to which ULO feed is exposed is a completely miscible material, a recycled lubricant boiling range material derived from the ULO feed. There is no "hot" solid surface for additives to cling to, the heat brought in the form of a superheated compatible fluid, the recycled gas oil fraction. The additives may or may not significantly decompose, but they will not preferentially deposit upon hot metal surfaces, as the metal surfaces are cooler than the fluid contained or flowing in them.

Using a heated, recycle stream of recovered lubricant boiling range molecules, and heating this stream, rather than the ULO feed in fact allows all process constraints, thermal cracking, minimum temperature and no metal hot spots, to be satisfied.

The lubricant boiling range material recovered as a product of the process is a distilled material. In the early days of the catalytic cracking process, refiners knew that the catalysts and technology available could not tolerate the "heavy ends" of the feed, usually because of metals content. By distilling the feed and sending to the cat cracker only the distilled feed, the metal problems were left behind in the crude column used to prepare cat cracker feed.

In our ULO re-refining process, the troublesome additives are left behind in the vacuum column, so the recovered, and recycled, product is essentially free of metals. Like gas oil recovered from a crude column in the early days of refining our gas oil recovered from vacuum distillation of ULO is free of metals. The hard part of any ULO re-refining process is getting the feed ULO hot enough in a continuous process so that the lube components can be vaporized. Re-refining is easy to do in a laboratory, simply heat up a flask, preferably under vacuum, and raise the temperature until the desired lube boiling range components are recovered, then discard the by-now-thoroughly-fouled flask. A commercial process has to operate for months and preferably years without being shut down due to fouling. Our recycled gas oil fraction being free of metals and the troublesome zinc additives can tolerate much more severe heating than ULO feed, so we heat some of the recovered product to heat the feed without fouling up the heater.

Our recycled gas oil fraction is highly paraffinic. It is more susceptible to thermal cracking than gas oil with a similar boiling range derived from most crudes. Fortunately, thermal cracking can be minimized, by designing the heater or heat exchanger used to head the recovered and recycled lube boiling range material so that there is a low residence time in the heater or heat exchanger. When contacting ULO feed, the residence time in the mixer (if used) and the piping leading into the vacuum column can be very short.

Thermal cracking of the recycled gas oil fraction during heating, or superheating, may be minimized in several ways. When a fired heater is used, it is possible to reduce the residence time of the recycled gas oil by sizing the heater for high superficial velocities in the tubes and designing the heater to minimize high tube wall temperatures. In a somewhat similar application, coker heaters, it was reported that great variability in heater performance, or run length was observed. The author reported that some heaters had coil outlet temperatures of 750-760° F. and low flux rates, but could not run for more than 2 years, while others had higher outlet temperatures and flux rates and ran for four years. Different techniques were discussed which could be used to reduce residence time of oil feed in the furnace, both overall and at high temperature. The use of higher mass velocities and steam injection reduced oil residence time from 60 seconds to 15 seconds. The author reported that residence time of the oil film at peak film temperature, 850° F. for this coker furnace, was reduced from 15 seconds before the revamp to less than 3 seconds. Barletta, Tony, "Why Vacuum Unit Fired Heaters Coke," *Petroleum Technology Quarterly*, Autumn 2001 issue.

The temperature required to vaporize lube oil boiling range hydrocarbons is less than that required for efficient operation of a coker, but the principle is the same, careful furnace design can minimize high temperature experienced by the oil in the furnace. In addition, it may be beneficial in our process to operate with addition of some steam, to reduce residence time of recycled gas oil in the heater. This steam will increase the pressure in the system, will increase the load on the vacuum system, but can generally be condensed by cooling residual overhead vapors. This means that the bulk of the steam injection is removed by downstream condensation rather than using the vacuum system.

An even more effective way to reduce thermal cracking of recycled gas oil during heating thereof is to use a heat exchanger. A fired heater can produce a high temperature fluid and this can be heat exchanged against a recycled gas oil fraction. In a heat exchanger. The temperature of the heat exchanger tubes in a fired heater can easily be 50-100° F. higher than the target discharge temperature, creating a situation where oil being heated can cling or be in a stagnant region and start to coke. In contrast, in a heat exchanger, rather than fire being on the other side of the tube wall, there is a fluid, such as a thermally stable heat transfer fluid, which is hotter than the recycled gas oil, but not nearly as hot as the radiant or convection section of a fired heater. It is possible to operate with a heat transfer fluid having a temperature of say 750° F. when heating a recycled gas oil fraction to 725° F. The highest temperature the recycled gas oil can experience is that of the heat transfer fluid, so 750° F. is the highest temperature the recycled gas oil will experience. Had a fired heater been used, the recycled gas oil could easily see a tube wall temperature of 800° F. or higher.

To further reduce thermal cracking when a heat exchanger is used to heat the recycled gas oil fraction, it is beneficial to use one of several proprietary heat exchangers, which are designed to enhance heat transfer rates for temperature sensitive products. Suitable heat exchangers include the Sulzer SMXL multitube or monotube.

Direct Contact Heating of ULO Feedstocks

This portion of the process mixes directly the superheated, recycled, lubricant boiling range hydrocarbons recovered from the product with the incoming ULO feed. There is direct contact heating of the relatively cool, typically 350-450° F. ULO feed with the superheated recycle product, typically at 600-800° F. and sufficient in temperature and amount to achieve the desired temperature, and desired amount of product uplift, in the vacuum column.

At its simplest, direct contact heating can occur in a simple length of pipe. The fluids will be flowing at high velocity, in fully developed turbulent flow, which is an effective method of mixing ULO feed with recycled, superheated lubricant boiling range hydrocarbons. To improve mixing, it will be beneficial in some circumstances to contact the two fluids, ULO feed and recycled, superheated fluid, using an in-line mixer, such as the Sulzer Compax. This device if used should be placed near the heater or heat exchanger outlet for mixing of the superheated recycled hydrocarbons with ULO feed. In such a mixer, multiple mixing elements create turbulent flow and good mixing. Uniform mixing can be achieved within three pipe diameters downstream of the injection point. Other in-line mixing devices may be used, if desired.

The process of the present invention is a breakthrough in ULO processing, using recycled product to heat ULO. Quite a lot of heat or energy is added via the recycled lube vapor, enough to vaporize the recycled material and to vaporize the desired amount of lubricant boiling range material in the ULO feed. Using this approach the ULO feed need never be exposed to heated metal surfaces. The hottest thing the ULO "sees" is a recycled lube fraction which is completely compatible with the ULO feed. The heat needs of the process are met by heating a relatively clean, distilled product, the lubricant boiling range hydrocarbons recovered from the ULO feed. This recycled material is more stable and has significantly reduced coke forming tendencies, as compared to ULO feed. Thermal cracking of the recycled material can be reduced by careful design of the any fired furnace used for heating thereof, or even more effectively by using a heat transfer fluid in a heat exchanger to heat the recycle material. Further reduction in thermal cracking of recycled material may be achieved by incorporating into the tubes, whether used in the heater or a heat exchange in line mixers or wall wipers, that move recycled gas oil from the metal tube walls to central portions of the tube, thereby reducing extended exposure of oil to high temperatures at the tube wall. The ULO feed is efficiently mixed with the superheated recycle material, either by direct contact in a pipe operating with turbulent conditions and/or using an in-line mixer.

It is possible to operate the entire process, with multiple flash vessels and a vacuum fractionator, with only a single heat source, a fired heater which directly or indirectly heats the recycled lube oil fraction. It is even possible to apportion this heated, or more accurately superheated, fraction, to supply the heat for vacuum fractionation and as the sole source or supplemental source of heat input for the vacuum flash or even the dehydration step. Usually some exchange of feed ULO with liquid product streams will be preferred for maximum energy efficiency.

Although the Figures illustrated the process with a dehydration flash, an atmospheric flash and a vacuum fractionator, it is possible to combine one or more of these steps, e.g., distillation and atmospheric flash, or to get multiple product fractions from the vacuum column, such as a light lube oil fraction and a heavy lube oil fraction, in addition to the bottoms residue fraction. Although mention has frequently been made of recovery of lube oil boiling range hydrocarbons, these recovered materials have myriad uses, including as a lube blending stock with or without hydrotreating, as fuel, or as cat cracker feed.

In some circumstances, the process may be run to have only a combined dehydration and flash step before the ULO "sees" the recycled superheated fluid. This may be the case when the single flash step produces enough burnable material to supply the fuel needs of the process and there is much demand for either the liquid product comprising the lubricant boiling range fractions or, less frequently, for the bottoms product, which may be used as an asphalt blending component. In some circumstances, it may be beneficial to have a dehydration step and then a flash step which removes primarily gasoline boiling range materials. An additional flashing, or even fractionation, step may occur when it is desired to obtain a diesel product, or a gasoline and/or diesel product which has a narrower boiling range.

When the most valuable end product is a liquid fraction comprising the lubricant boiling range material and this material will be used a feed for an FCC unit, then the process will be run to maximize production of this stream. If a lubricant product is desired, it may be beneficial to flash and/or fractionate enough lighter hydrocarbons to minimize the amount of distillation required for the lubricant product.

ILLUSTRATIVE EMBODIMENT

The following illustrative embodiment is based on a computer simulation rather than an actual experiment. The data presented are believed accurate and reliable, in fact for distillation of heavy complex mixtures the computer data are frequently more reliable than laboratory data, especially as only distillation is involved.

The heat and material balance is based on a complete and complex simulation of the plant, with multiple heat exchangers to achieve maximum heat recovery. While this approach is ideal in terms of energy conservation, the complexity of the simulation makes it harder to follow, so the simulation presented in the table uses only representative data points, fresh feed and flashing of gasoline and water. This prepares a preheated and de-volatized lube oil and heavier boiling range fraction which is mixed with a recycled, vaporized, lube product fraction. The resulting mixture is then flashed across a valve, and then discharged into a vapor/liquid separator and conventional fractionation means. The ultimate yields of light ends, water, lube oil product both withdrawn as product and recycled as superheated vapor, and a recovered bottoms fraction are reported.

TABLE

| Stream | Cold feed | Flash drum feed | Flashed feed | Recycled Lube Vap. | Feed + Recycle vap. | Vaporized lube fraction | Hot residual fraction | Light Ends | Gasoline to storage | Water to storage | Lube product to storage | Residual to storage |
|---|---|---|---|---|---|---|---|---|---|---|---|---|
| Rate lb/hr | 17,760 | 17,760 | 16,204 | 64,000 | 80,204 | 77,356 | 2,848 | 0 | 496 | 519 | 13,366 | 2,838 |
| Temperature °F. | 70 | 450 | 444 | 800 | 734 | 600 | 600 | | 90 | 131 | 300 | 323 |
| Pressure PSIA | 14.70 | 14.70 | 30.45 | 30.00 | 30.00 | 0.45 | 0.45 | | 0.45 | 14.70 | 30.00 | 14.70 |
| Molecular Wt | 229.35 | 229.35 | 378.37 | 359.08 | 362.82 | 359.23 | 497.66 | | 217.20 | 18.01 | 359.08 | 497.94 |
| API Gravity | 19.71 | 19.71 | 18.98 | 20.33 | 20.06 | 20.32 | 12.85 | | 31.49 | 10.06 | 20.33 | 12.84 |

We claim:

1. A process for re-refining a used lubricating oil (ULO) feed containing lubricant boiling range hydrocarbons and thermally unstable additives which foul metal surfaces used to heat said ULO to vaporize said lubricant boiling range hydrocarbons comprising:
   a. heating by direct contact heating of said ULO with a superheated fluid comprising lubricant boiling range hydrocarbons recovered from said ULO to form a heated mixture of said ULO and said superheated fluid,
   b. fractionating said heated mixture in a vacuum fractionation means to produce a vapor fraction comprising at least a majority of the lubricant boiling range hydrocarbons in said ULO feed and a residual liquid fraction comprising said thermally unstable additives and a minority of said lubricant boiling range hydrocarbons in said ULO feed,
   c. cooling and condensing at least a portion of said vapor fraction to produce an overhead liquid comprising at least a majority of lubricant boiling range hydrocarbons in said ULO feed and at least a majority of said lubricant boiling range hydrocarbons in said superheated fluid, recovering a portion of said overhead liquid as a lubricant boiling range product of the process and recycling a portion of said overhead liquid through a heating means to produce a superheated fluid comprising lubricant boiling range hydrocarbons and using said superheated fluid for said direct contact heating of said ULO feed and wherein enough heat or energy is added via said recycled, superheated, lubricant boiling range hydrocarbons to vaporize at least a majority of said lubricant boiling range hydrocarbons in said ULO feed in said vacuum fractionation means.

2. The process of claim 1 wherein said ULO is dehydrated prior to contact with said superheated fluid and said dehydration comprises heating said ULO feed to a temperature and at a pressure sufficient to dehydrate said ULO feed and produce a dehydrated ULO feed which is then heated by direct contact heating with said superheated fluid.

3. The process of claim 2 wherein said dehydration occurs at atmospheric pressure and said dehydrated ULO is charged to a vacuum flash operating under vacuum and the temperature and pressure in said vacuum flash are sufficient to vaporize at least a molar majority of the hydrocarbons boiling below the lubricant boiling range.

4. The process of claim 2 wherein said ULO feed is preheated for dehydration by heat exchange with vaporized lubricant boiling range hydrocarbons produced in said vacuum fractionator or a liquid fraction thereof.

5. The process of claim 2 wherein said dehydration step comprises pre-heating said ULO feed in a heat exchanger having in-line mixing elements.

6. The process of claim 1 wherein said ULO is heated to a temperature and at a pressure sufficient to vaporize at least a molar majority of the hydrocarbons boiling below the lubricant boiling range and said heating is achieved at least in part by direct contact heating with said superheated fluid and to produce a devolatized ULO liquid fraction which is mixed with additional superheated recycle fluid and charged into said vacuum fractionation means.

7. The process of claim 1 wherein contact of said ULO feed with said superheated fluid occurs in, or immediately upstream of, an in-line mixing means.

8. The process of claim 1 wherein said recycled overhead liquid is heated in a heat exchanger to produce said superheated fluid.

9. The process of claim 1 wherein said recycled liquid is heated in a fired heater to produce said superheated fluid.

10. An apparatus for distilling a liquid feed comprising at least one of water and hydrocarbons boiling below the lubricant boiling range, lubricant boiling range hydrocarbons and thermally unstable additives which form coke when heated indirectly on a hot metal surface, said apparatus comprising
   a. a preheater means receiving said liquid feed and discharging a preheated feed;
   b. an atmospheric flash vessel receiving said preheated liquid and discharging a vapor stream and an atmospheric flash liquid bottoms stream;
   c. a vacuum flash vessel receiving said atmospheric flash liquid bottoms stream and discharging a vapor stream and a vacuum flash liquid bottoms stream;
   d. a mixer receiving said vacuum flash liquid bottoms stream and a recycled, superheated recovered product stream and discharging a heated mixture;
   e. a fractionator receiving said heated mixture and fractionating it into at least one overhead vapor stream comprising lubricant boiling range hydrocarbons and a liquid residue comprising said unstable additives or decomposition products thereof and a minor portion of lubricant boiling range hydrocarbons;
   f. a fractionator overhead vapor condenser and receiver cooling and condensing said fractionator overhead vapor into a liquid overhead stream comprising lubricating boiling range hydrocarbons and splitting said liquid overhead into at least two streams, a product stream withdrawn as a product of the process and a recycle stream;
   g. a recycle heater receiving said recycle stream and producing a superheated recovered product stream which is charged to said mixing means.

11. The apparatus of claim 10 wherein said mixing means is an in-line static mixer.

12. The apparatus of claim 10 wherein said mixing means is a pipe.

13. A process for re-refining a used lubricating oil (ULO) feed containing lubricant boiling range hydrocarbons, thermally unstable additives which foul metal surfaces used to heat said ULO to vaporize said lubricant boiling range hydrocarbons, and hydrocarbons boiling below the lubricant boiling range comprising:

a. heating said ULO by heat exchange with a liquid or vapor product of the process to form a heated ULO feed containing lubricant boiling range hydrocarbons, hydrocarbons boiling below the lubricant boiling range and said thermally unstable additives;
b. flashing said heated ULO feed in a vacuum flash means operating under vacuum and at a temperature and pressure sufficient to vaporize at least a molar majority of hydrocarbons boiling below the lubricant boiling range to produce a vapor phase comprising at least a majority of the hydrocarbons boiling below the lubricant boiling range which is recovered as a product of the process and a vacuum flash liquid phase comprising at least a majority of said lubricant boiling range hydrocarbons in said ULO feed and containing thermally unstable additives,
c. heating said vacuum flash liquid phase recovered from said vacuum flash means by direct contact heating with a recycled superheated fluid of lubricant boiling range hydrocarbons recovered from said ULO to produce a heated flash liquid,
d. fractionating said heated flash liquid in a vacuum fractionation means operating at a temperature and pressure sufficient to produce a vacuum fractionation means vapor product comprising at least a majority of the lubricant boiling range hydrocarbons in said ULO feed and a liquid residual product comprising a minority of the lubricant boiling range hydrocarbons in said ULO feed,
e. cooling and condensing at least a portion of said vacuum fractionation means vapor product to produce a liquid lubricant boiling range product stream, comprising at least a majority of lubricant boiling range hydrocarbons in said ULO feed, which is removed from said vacuum fractionation means as a product of the process
f. recovering said liquid residual product from said vacuum fractionation means as a product of the process, and
g. recycling a portion of said lubricant boiling range product recovered from said vacuum fractionation means through a heating means to produce a superheated fluid of lubricant boiling range hydrocarbons for said direct contact heating of said vacuum flash liquid phase to produce said heated mixture charged to said vacuum fractionation means and wherein heat or energy is added via said recycled, superheated, lubricant boiling range hydrocarbons to vaporize at least a majority of the lubricant boiling range material in said ULO feed in said vacuum fractionation means.

* * * * *